United States Patent [19]

Beschke et al.

[11] 3,898,177

[45] Aug. 5, 1975

[54] CATALYSTS FOR THE PRODUCTION OF PYRIDINE AND 3-METHYLPYRIDINE

[75] Inventors: Helmut Beschke; Hans Schaefer; Gerd Schreyer, all of Grossauheim; Wilhelm Alfons Schuler, near Homburg; Wolfgang Weigert, Offenbach, all of Germany

[73] Assignee: Deutsche Gold- und Silber-Scheideanstalt vormals Roessler, Germany

[22] Filed: Oct. 10, 1972

[21] Appl. No.: 296,135

[30] Foreign Application Priority Data
Oct. 15, 1971 Germany............................ 2151417

[52] U.S. Cl. ................ 252/432; 252/433; 252/442; 260/290 R
[51] Int. Cl. ......................... B01j 21/02; B01j 27/12
[58] Field of Search.................... 252/433, 442, 432

[56] References Cited
UNITED STATES PATENTS

| | | | |
|---|---|---|---|
| 2,400,446 | 5/1946 | Veltman | 252/442 X |
| 2,466,706 | 4/1949 | Hughes et al. | 252/433 X |
| 2,827,421 | 3/1958 | Erickson | 252/442 X |
| 3,318,821 | 5/1967 | Pollitzer et al. | 252/442 |
| 3,364,151 | 1/1968 | Disegna et al. | 252/442 X |
| 3,432,562 | 3/1969 | Gardner | 252/442 X |
| 3,456,034 | 7/1969 | Sanford et al. | 252/442 X |
| 3,457,189 | 7/1969 | DeLosset | 252/442 |
| 3,476,817 | 11/1969 | Vecchio et al. | 252/442 X |
| 3,525,699 | 8/1970 | Koppel et al. | 252/433 |
| 3,619,412 | 11/1971 | Clement et al. | 252/442 X |

*Primary Examiner*—Patrick P. Garvin
*Attorney, Agent, or Firm*—Cushman, Darby & Cushman

[57] ABSTRACT

Catalysts for the reaction of acrolein with ammonia to form pyridine and 3-methylpyridine are prepared by treating a compound of the elements Al, F and O and at least one element of the second, third or fourth group of the periodic system with oxygen at 550° to 1,200°C.

12 Claims, No Drawings

CATALYSTS FOR THE PRODUCTION OF PYRIDINE AND 3-METHYLPYRIDINE

The invention is concerned with catalysts for the reaction of acrolein with ammonia to form pyridine and 3-methyl pyridine.

Several processes are known for the production of pyridine and methyl pyridine from acrolein and ammonia. They differ essentially in the particular catalysts used. Materials based on the oxides and silicates of aluminum are chiefly employed as such catalysts. Fluorine compound containing aluminum oxide or aluminum silicate are used (East Germany Pat. No. 58,960) or fluosilicic acid or fluoboric acid containing aluminum silicate (German Offenlegungsschrift 1,917,037). There have also been used zeolitic molecular sieves containing lanthanide cations (German Offenlegungsschrift 2,023,158). All known processes result is small space-time-yields.

Hall U.S. Pat. No. 3,381,011 shows preparing pyridine and 3-methyl pyridine by a different procedure, namely by reacting ammonium with formaldehyde and acetaldehyde in the presence of various silica-alumina catalysts. The catalyst can also contain lead fluroide, see examples 30–32 and Table 2 and can be heated to 400°–500°C. The catalyst also can be pretreated at 550°–850°C. to partially deactivate it.

There have now been found catalysts for forming pyridine and 3-methyl pyridine by reacting acrolein with ammonia which catalysts consist of the element Al, F and O and one or more elements of the second, third and fourth groups of the periodic system that have been preliminarily treated with an oxygen containing gas at 550° to 1200°C. Surprisingly using catalysts so prepared there are obtained very high space-time-yields.

The catalysts of the invention contain the elements Al, F and O and additionally one or more elements of the second, third and fourth groups, the main group and the side group, of the periodic system. Preferably they contain the elements Al, F and O as well as B and-/or Si and also one or more elements of the second and fourth groups as set forth below. Especially preferred are compounds containing Al, F and O, as well as B and/or Si and also one or more of the elements Mg, Ba, Zn, Sn and Zr. The elements are present in the catalyst generally as oxides or as compounds with each other and oxygen.

To produce the catalysts of the invention first there are prepared suitable mixtures of starting materials containing the corresponding elements and these are then treated with oxygen at a temperature of 550° to 1200°C.

The aluminum is generally added as the oxide. However, it can also be added as the metal or as any desired compound of aluminum provided it can be converted to aluminum oxide. Thus, for example, there can be employed aluminum nitrate, aluminum acetate or aluminum oxalate. Also the catalyst constituents made of the elements of the second, third and fourth group of the periodic system can generally be added as the oxides, e.g., magnesium oxide, barium oxide, zinc oxide, boric oxide, tin dioxide, zirconium dioxide and silica. The elements themselves can be added, e.g., magnesium, zinc, tin, zirconium, silicon or boron, or any desired compound of these elements which can be converted with oxygen to the oxide. These compounds include especially the salts which can be decomposed by heating, as for example the nitrates, acetates and oxalates, e.g., magnesium nitrate, magnesium acetate, magnesium oxalate, barium acetate, barium nitrate, barium oxalate, zinc nitrate, zinc oxalate, zinc acetate, stannic acetate, stannic oxalate, stannic nitrate, stannous nitrate, zirconium acetate, zirconium nitrate, and zirconyl nitrate.

The fluorine is added as a solid, liquid or gaseous compound; especially as a compound which is soluble or hydrolyzable in water. For example, there can be employed ammonium fluoride, ammonium hydrogen fluoride and especially hydrofluoric acid, fluoboric acid, fluosilicic acid and boron trifluoride, in a given case in admixture, especially of fluoboric acid and fluosilicic acid or of ammonium hydrogen fluoride and fluosilicic acid.

The mixtures of starting materials are generally so chosen that the atomic ratio of Al to F is between 1,000 to 25 and 1,000 to 800, especially between 1,000 to 50 and 1,000 to 500. The atomic ratio of Al to the total additional elements of the second, third and fourth groups suitably is between 1000 to 5 and 1,000 to 200, especially between 1,000 to 10 and 1000 to 100. When there are present both boron (or silicon) and an additional element of the second or fourth group the atomic ratio of boron (or silicon) to the additional element is usually between 1 to 10 and 10 to 1. When both boron and silicon are present the atomic ratio of boron to silicon is usually between 3 to 1 and 1 to 3.

There are many possibilities for the preparation of the mixtures of starting material. Which method of operation to use depends generally on the type of material employed. Although the different compound can be brought together in any sequence it has proven advantageous to always add the fluorine containing compound last. It is suitable to add one or more of the materials as aqueous solutions or as suspensions in water and to recover the catalyst evaporate to dryness or to dry at a temperature between 100° and 200°C.

For example, the aluminum oxide in the form of a powder, granules or pressed objects such as tablets and spheres can be mixed with aqueous solutions of the other materials. There can also be added an aqueous solution of an aluminum compound, e.g., aluminum nitrate or aluminum acetate, and the aluminum precipitated as the hydroxide from such a solution; before, during or after the precipitation, the remaining materials, can be added, in a given case in portions. In the case where gaseous fluorine comounds are employed, the aluminum oxide alone or mixed with the other materials, suitable in the presence of moisture can be gassed with fluorine compound. It can also be advantageous to first mix two materials with each other using water and to dry this mixture before adding an additional material.

The mixtures thus prepared are heated to a temperature of between 500° and 1,200°C. and treated at this temperature for some time. The procedure used for this treatment as well as the temperature and duration of treatment is adjusted according to the type of starting material and according to the method chosen for preparation of the mixture.

The mixture can be directly heated to the treatment temperature. It can be advantageous, however, to first only heat the mixture moderately and to slowly increase the temperature, in a given case in the course of several hours, uniformly or preferably stepwise to the treatment temperature between 550° and 1,200°C.

For the actual treatment with oxygen the mixture is heated to a temperature between 550° and 1200°C., preferably between 600° and 800°C. It can be advantageous to heat the mixtures successively at different temperatures within this range. Hereby there can be used either higher or lower temperatures. The treatment lasts in all between about 2 and 20 hours, preferably about 3 to 10 hours. Generally air is employed as the oxygen containing gas but there can also be employed pure oxygen or a mixture of oxygen with an inert gas, e.g., argon.

In the treatment with oxygen the corresponding compounds are formed in the mixtures in the event they are not added as oxides or other compounds with oxygen. The change in these compounds, however, can also have taken place entirely or partially before or during the preparation of the mixtures.

A preferred procedure is for the aluminum oxide present in a form having a surface area (BET) between 80 and 400 m²/g., especially a surface area (BET) between 200 and 350 m²/g, and in a given case in the form of pressed objects, to be treated with an aqueous solution of the nitrate or oxalate of the other elements, to dry this mixture by heating to about 100°C., to treat the dry material with the fluorine containing compound, especially fluoboric acid or fluosilicic acid, to dry this mixture by heating to about 100°C. and finally to treat this dry material for 3 to 10 hours at 600° to 800°C. with oxygen, e.g., as air.

The catalysts are suitable for use in either fixed beds or in fluidized beds and are added accordingly, for example, in the form of pellets or in granular form.

The reaction of the acrolein with ammonia to form pyridine and 3-methyl pyridine using the catalysts of the invention can take place in conventional manner in the gas phase. It is carried out chiefly at normal pressure or under a slight excess pressure up to 3 atmospheres at a temperature between 300° and 500°C., especially between 350° and 450°C. The proportions of ammonia to acrolein are generally so chosen that there is employed more ammonia than is present according to the stoichiometrically required 0.5 mole of ammonia for each mole of acrolein. There are chiefly used between 1 and 10 moles of ammonia, preferably between 1 and 3 moles of ammonia per mole of acrolein. Ammonia and acrolein are preferably added in diluted form. Thus they can be added in admixture with nitrogen, air, oxygen, steam or organic carrier gases as benzene for example. By the content of oxygen in the gas mixture there can be controlled, in a given case, whether the formation of pyridine or 3-methyl pyridine is favored. At a content of 1 to 4 moles of oxygen per mole of acrolein pyridine is formed preferentially. At a lesser oxygen content 3-methyl pyridine is favored. With inert gases such as nitrogen, steam or benzene 3-methyl pyridine is favored. It is advantageous to first dilute the acrolein with the foreign gas and to mix in the ammonia at a temperature of 200° to 400°C. immediately before the reaction zone. The reaction conditions such as temperature, dilution of the gases, and velocity of flow are suitably so formulated to each other that the residence time in the reaction zone is 0.5 to 5.0 seconds, especially 1.0 to 2.5 seconds. The recovery of the pyridine and 3-methyl pyridine from the reaction mixture takes place in the usual manner.

Unless otherwise indicated all parts and percentages are by weight.

In the following examples there are used the concepts.

$$\text{Yield} = \frac{\text{Moles of product formed}}{\text{Moles of acrolein added}} \times 2 \times 100 \, (\%)$$

$$\text{Space-time-yield} = \frac{\text{Amount of Product formed/Time}}{\text{Bulk volume of the catalyst}} \left(\frac{g}{l \times h}\right)$$

The term product signifies the sum of pyridine and 3-methyl pyridine.

The gas volumes recited are based on room temperature.

EXAMPLE 1

1300 grams of aluminum oxide in the form of extruded strands having a diameter of 2 mm and a length of 4 to 6 mm with a surface area (BET) of 300 m²/g were treated with a solution of 161 grams of analytically pure magnesium nitrate hexahydrate (mg $(NO_3)_2 \cdot 6H_2O$) in 1000 ml. of water and 30 ml. of concentrated nitric acid. The mixture was subsequently dried while it was held at 100°C. for 8 hours. The dry material was stirred with a mixture of 130 ml. of 32% fluoboric acid, 210 ml of 34% fluosilicic acid and 700 ml. of water. About 400 ml. of liquid which was not taken up by the material was decanted off. The material was dried while it was held for 2 hours at 100°C. It was finally treated with the residual 400 ml. of liquid which now was completely taken up. Then the material was heated in an air stream for 12 hours at 100°C. and for a further 4 hours at 700°C.

In a uniform stream there were passed hourly over one liter (bulk volume) of the catalyst a gas mixture of 282 grams (5.04 moles) of acrolein, 330 liters (13.8 moles) of nitrogen and 240 liters (10.0 moles) of ammonia. The ammonia gas was mixed with the other gases directly at the entrance of the reactor through a binary nozzle in a turbulent stream. The gases had an entrance temperature of 220°C. The catalyst was preheated to 380°C; in the course of the reaction the temperature was between 400° and 420°C. The reaction gases were washed with water; from the wash liquid the product was continuously extracted with benzene. Fractional distillation yielded hourly 53 grams (0.67 moles) of pyridine and 103 grams (1.11 moles) of 3-methyl pyridine. The yield amounted to 71%, the space-time-yield was 156 grams/liter × hour.

EXAMPLE 2

1,300 grams of the aluminum oxide described in example 1 were stirred with heating with a solution of 168 grams of zirconyl nitrate (ZrO $(NO_3)_2$; 40% zirconium content) in 1120 ml. of water and 30 ml. of concentrated nitric acid until the entire liquid gas was taken up. The material was held at 100°C. for 12 hours to dry it. Subsequently, it was mixed with a solution of 130 ml. of 32% fluoboric acid in 500 ml. of water, heated at 100°C. for 6 hours to dry it and then treated with a solution of 210 ml. of 34% fluosilicic acid in 350 ml. of water, heated for 8 hours at 100°C. to dry it and finally held for 4 hours in an airstream at 700°C. The reaction of acrolein with ammonia took place in the manner described in example 1. Hourly there were recovered 51 grams (0.65 moles) of pyridine and 101 grams (1.09 moles) of 3-methyl pyridine. The yield amounted to 69%, the space-time-yield 153 grams/$l \times h$.

EXAMPLE 3

The procedure employed was the same as in example 1 but there was used the catalyst prepared in example 2. There were led over the catalyst hourly a gaseous mixture of 577 grams (10.3 moles) of acrolein, 475 liters (19.8 moles) of nitrogen and 525 liters (21.9 moles) of ammonia. The temperature of the catalyst was 410° to 450°C. There were recovered hourly 99 grams (1.25 moles) of pyridine and 220 grams (2.37 moles) of 3-methyl pyridine. The yield amounted to 70%, the space-time-yield 319 $g/l \times h$.

The reaction was carried out for one day before it showed a reduction in yield. Regeneration of the catalyst was accomplished by holding the reactor at a temperature near 500°C for one hour and instead of using the reaction mixture of ammonia and acrolein leading through a gas stream which initially consisted of nitrogen with about 5% air and then gradually increasing the air content and finally leading through air without any nitrogen being added. After this treatment the catalyst was found to be regenerated and fully effective again.

EXAMPLE 4

1,300 grams of aluminum oxide described in example 1 were stirred with heating with a solution of 168 grams of zirconyl nitrate (ZrO (NO$_3$)$_2$; 40% zirconium content) in 1,120 ml. of water and 30 ml. of concentrated nitric acid until the entire liquid was absorbed. The material was held for 12 hours at 100°C. to dry. Subsequently it was mixed with a solution of 161 grams of analytically pure magnesium nitrate hexahydrate (Mg (NO$_3$)$_2$.6H$_2$O) in 1,000 ml. of water and 30 ml. of concentrated nitric acid, heated for 6 hours at 100°C. to dry it, then mixed with a solution of 130 ml. of 32% fluoboric acid in 500 ml. of water, heated for 6 hours at 100°C. to dry it, and finally held for 6 hours in an airstream at 650°C. The reaction of the acrolein with ammonia was carried out in the manner described in example 1. There were recovered hourly 46 grams (0.58 mole) of pyridine and 91 grams (0.98 mole) of 3-methyl pyridine. The yield amounted to 62%, the space-time-yield 137 $g/l \times h$.

EXAMPLE 5

1,300 grams of the aluminum oxide described in example 1 were stirred with heating with a solution of 161 grams of analytically pure magnesium nitrate hexahydrate in 1,000 ml. of water and 30 ml. of concentrated nitric acid until the time liquid was absorbed. The material was held for 12 hours at 100°C. to dry it, then mixed with a solution of 210 ml. of 34% fluosilicic acid in 400 ml. of water and heated for 8 hours at 100°C. to dry it and finally hold for 4 hours in an airstream at 750°C. The reaction of acrolein with ammonia was carried out according to example 3. There were recovered hourly 96 grams (1.21 moles) of pyridine and 189 grams (2.03 moles) of 3-methyl pyridine. The yield amounted to 63%, the space-time-yield 285 $g/l \times h$.

EXAMPLE 6

1,300 grams of the aluminum oxide described in example 1 were mixed with a solution of 161 grams of analytically pure magnesium nitrate hexahydrate in 1,000 ml. of water and 30 ml. of concentrated nitric acid. The mixture was dried, treated with a solution of 130 ml. of 32% fluoboric acid in 500 ml. of water and dried again. Then it was held in an airstream for 2 hours at 500°C. and for a further 4 hours at 700°C. The reaction of the acrolein with ammonia took place in the manner described in example 3. There were recovered hourly 98 grams (1.24 moles) of pyridine and 203 grams (2.18 moles) of 3-methyl pyridine. The yield amounted to 67%, the space-time-yield 301 grams $g/l \times h$.

EXAMPLE 7

1,300 grams of the aluminum oxide described in example 1 were mixed with a solution of 168 grams of zirconyl nitrate in 1,120 ml. of water and 30 ml. of concentrated nitric acid. The mixture was dried, subsequently treated with a solution of 161 grams of magnesium nitrate hexahydrate in 1,000 ml. of water and 30 ml. of concentrated nitric acid and dried again. Then there was added a solution of 210 ml of 34% fluosilicic acid in 350 ml. of water. The material was dried and held for 4 hours in an airstream at 700°C. The reaction of the acrolein with ammonium was carried out as in example 1. There were recovered hourly 47 grams (0.59 mole) of pyridine and 88 grams (0.95 mole) of 3-methyl pyridine. The yield was 61%, the space-time-yield was b 135 grams /l $\times$ h.

EXAMPLE 8

1,320 grams of aluminum oxide in the form of spheres having a diameter of 4 to 6 mm. and a surface area (BET) of 250 m$^2$/g were treated with a solution of 327 grams of analytically pure zinc nitrate hexahydrate in 380 ml. of water. The mixture was dried by heating at 100°C., subsequently stirred with 360 ml. of 34% fluosilicic acid and dried again by heating to 100°C. It was finally held in a stream of air for 4 hours at 700°C. The reaction of the acrolein with ammonia was carried out as described in example 1. There were recovered hourly 47 grams (0.60 moles) of pyridine and 91 grams (0.98 mole) of 3-methyl pyridine. The yield was 63%, the space-time-yield 138 g/l $\times$ h.

EXAMPLE 9

1,320 grams of aluminum oxide in the form of spheres 2 to 4 mm. in diameter and having a surface area (BET) of 100 m$^2$/g were treated with a solution of 110 grams of barium nitrate Ba (NO$_3$)$_2$) in 800 ml. of water. The mixture was heated to dryness at 100°C., subsequently treated with a solution of 138 ml. of 34% fluosilicic in 620 ml. of water, and dried again by heating at 100°C. and finally held for 4 hours in a stream of air at 700°C. The reaction of acrolein with ammonia was carried out in the manner described in example 3. There were recovered hourly 84 grams (1.06 moles of pyridine and 194 grams (2.09 moles) of 3-methyl pyridine. The yield was 61% the space-time-yield 278 g/l $\times$ h.

EXAMPLE 10

1,300 grams of the aluminum oxide described in example 9 were mixed with a solution of 87 grams of tin oxalate in 700 ml. of water and 100 ml. of concentrated nitric acid. The mixture was heated at 100°C. to dry it, subsequently treated with a solution of 95 ml. of 32% fluoboric acid in 600 ml. of water, again dried by heating at 100°C. and finally held for 4 hours in a stream of air at 700°C. The reaction of the acrolein with ammonia took place as described in example 3. There were recovered hourly 99 grams (1.25 moles) of pyridine and 191 grams (2.05 moles) of 3-methyl pyridine. The yield amounted to 64%, the space-time-yield 289 g/l × h.

EXAMPLE 11

1,300 grams of the aluminum oxide described in example 1 was stirred with warming with a solution of 83 grams of zirconyl nitrate in 1000 ml. of water and 30 ml. of concentrated nitric acid until the entire liquid was absorbed. The mixture was held at 100°C. for 12 hours to dry it. Then it was exposed to a gas stream of boron trifluoride until about 70 grams of boron trifluoride were absorbed. It was then held in an airstream at 700°C. for 4 hours. The reaction of the acrolein with ammonia took place as described in example 3. There were recovered hourly 95 grams (1.20 moles) of pyridine and 203 grams (2.18 moles) of 3-methyl pyridine. The yield amounted to 66%, the space-time-yield 298 g/l × h.

What is claimed is:

1. A catalyst suitable for the reaction of acrolein with ammonia to form pyridine and 3-methyl pyridine, said catalyst consisting essentially of oxygen containing compounds of Al, F, at least one of the elements B and Si and at least one element from the second and fourth groups of the periodic system selected from the group consisting of Mg, Ba, Zn, Sn and Zr, said catalyst having been prepared by heating in the presence of oxygen at a temperature of 600° to 800°C.;
   1. aluminum, aluminum oxide or an aluminum compound convertible to the oxide at said temperature,
   2. a compound of fluorine, said fluorine having been added as ammonium fluoride, ammonium hydrogen fluoride, hydrogen fluoride, fluoboric acid, fluosilicic acid, boron trifluoride, magnesium fluoborate, magnesium fluosilicate, zinc fluosilicate or barium fluosilicate,
   3. boron, silicon, boric oxide, silica or a compound of boron or silica convertible to the oxide at said temperature and
   4. magnesium, zinc, tin, zirconium, magnesium oxide, zinc oxide, tin oxide or a compound of zirconium or barium convertible to the oxide at said temperature, the atomic ratio of Al to F being from 1000:25 to 1000:800 and the atomic ratio of Al to the total of (3) and (4) being from 1000:5 to 100:200, the atomic ratio of the total of boron and silicon to the other element from the second and fourth groups being between 1 to 10 and 10 to 1.

2. A catalyst according to claim 1 wherein component (3) is a boron component.

3. A catalyst according to claim 1 wherein component (3) is a silicon component.

4. A catalyst according to claim 1 wherein both boron and silicon are present and the atomic ratio of boron to silicon is between 3 to 1 and 1 to 3.

5. A catalyst according to claim 1 wherein the F is added in compound form as ammonium fluoride, ammonium hydrogen fluoride, hydrogen fluoride, fluoboric acid, fluosilicic acid or boron trifluoride.

6. A catalyst according to claim 1 including both B and Si.

7. A process of preparing a catalyst suitable for the reaction of acrolein with ammonia to form pyridine and 3-methyl pyridine, said catalyst consisting essentially of oxygen containing compounds of Al, F, at least one of the elements B and Si and at least one element from the second and fourth groups of the periodic system selected from the group consisting of Mg, Ba, Sn and Zr, said process comprising heating in the presence of oxygen at a temperature of 600° to 800°C.;
   1. aluminum, aluminum oxide or an aluminum compound convertible to the oxide at said temperature,
   2. a compound of fluorine, said fluorine having been added as ammonium fluoride, ammonium hydrogen fluoride, hydrogen fluoride, fluoboric acid, fluosilicic acid, boron trifluoride, magnesium fluoborate, magnesium fluosilicate, zinc fluosilicate or barium fluosilicate,
   3. boron, silicon, boric oxide, silica or a compound of boron or silica convertible to the oxide at said temperature and
   4. magnesium, zinc, tin, zirconium, magnesium oxide, zinc oxide, tin oxide or a compound of zirconium or barium convertible to the oxide at said temperature, the atomic ratio of Al to F being from 1000:25 to 1000:800 and the atomic ratio of Al to the total of (3) and (4) being from 1000:5 to 1000:200, the atomic ratio of the total of boron and silicon to the other element from the second and fourth group being between 1 to 10 and 10 to 1.

8. A process according to claim 7 wherein the F is added in compound form as ammonium fluoride, ammonium hydrogen fluoride, hydrogen fluoride, fluoboric acid, fluosilicic acid or boron trifluoride.

9. A process according to claim 8 wherein components (1) and (4) are added as a mixture in water of aluminum oxide or a water soluble aluminum salt with an oxide or a water soluble salt of Mg, Ba, Zn, Sn or Zr.

10. A process according to claim 9 wherein the fluorine containing compound is added in water to the mixture of the other materials.

11. A process according to claim 10 wherein the fluorine containing compound is fluoboric acid or fluosilicic acid.

12. A process according to claim 9 comprising drying the other materials prior to adding the fluorine containing compound and then adding boron trifluoride in gaseous form as the fluorine compound to said dry mixture.

* * * * *

UNITED STATES PATENT AND TRADEMARK OFFICE
CERTIFICATE OF CORRECTION

PATENT NO. : 3,898,177

DATED : August 5, 1975

INVENTOR(S) : BESCHKE, Helmut; SCHAEFER, Hans; SCHREYER, Gerd; SCHULER, Wilhelm and WEIGERT, Wolfgang It is certified that error appears in the above-identified patent and that said Letters Patent are hereby corrected as shown below:

Claim 1, column 7, line 50 change "100" to --1000--.

Signed and Sealed this

Fifteenth Day of May 1979

[SEAL]

Attest:

RUTH C. MASON
*Attesting Officer*

DONALD W. BANNER
*Commissioner of Patents and Trademarks*